Patented Mar. 3, 1931

1,794,537

UNITED STATES PATENT OFFICE

ROBERT C. PALMER, OF PENSACOLA, FLORIDA, ASSIGNOR TO THE NEWPORT COMPANY, OF CARROLLVILLE, WISCONSIN, A CORPORATION OF DELAWARE

PROCESS OF TREATING DECOLORIZING AGENTS

No Drawing.    Application filed December 24, 1927.   Serial No. 242,516.

This invention relates to a process of treating decolorizing agents, and more particularly, to a process of revivifying a purifying and decolorizing clay such as fuller's earth, as obtained in a contaminated form in a process of decolorizing rosins.

In my co-pending application entitled "Process of purifying and decolorizing rosin", Serial No. 220,646, filed September 19, 1927, I have described a method of purifying rosin, in which a decolorizing agent such as fuller's earth is used in the final purifying step. In that application, a statement is made that the fuller's earth is preferably revivified by any suitable process and reused in subsequent operations. In general, it is known that alcohols are probably the best solvents for the pitchy impurities of rosin which are extracted by fuller's earth. Nearly all of the well-known commercial alcohols, such as methanol (wood alcohol), ethyl alcohol, and some of the more volatile higher alcohols such as normal butyl alcohol, tertiary butyl alcohol and the like, have a common property of dissolving or extracting the impurities from fuller's earth.

Where alcohols alone are used, however, the clay, more especially if it is dry, tends to retain the alcohol and high losses may be thus entailed. It is essential, therefore, that the amount of alcohol used be as small as possible and that there be efficient means of recovering the alcohol used.

It is therefore an object of this invention to provide a simple and efficient method of revivifying a decolorizing agent such as fuller's earth, wherein an alcohol in combination with a petroleum distillate is economically used as the revivifying agent, whereby relatively small quantities of alcohol may be employed as the solvent for the impurities adsorbed by the clay.

Other and further important objects of this invention will become apparent from the following description and appended claims:

In carrying out my invention I make use of the fact that alcohol may be fractionally distilled from a hydrocarbon, as for instance petroleum naphtha, whose boiling range is above that of the alcohol used, and completely recovered in a concentration greater than that which exists in the original mixture to be distilled, provided the original mixture contains an excess of hydrocarbon. I also make use of the fact that alcohol is such a powerful solvent for adsorbed materials, as rosin impurities, that its solvent action is not greatly impaired by dilution with a petroleum hydrocarbon.

In general my process comprises treating a clay that has been used for removing color from an extraction mass of rosin in a petroleum distillate, with a mixture of an alcohol and a hydrocarbon, and displacing the solution of the impurities in the mixture so formed by means of a further quantity of hydrocarbon alone. Preferably the mixture for dissolving out the impurities from the clay is used hot, but it may also be used at ordinary temperatures. Furthermore, I prefer to use a mixture of a substantially anhydrous alcohol and petroleum naphtha mixed in approximately equal proportions. It is therefore necessary, when using an ordinary commercial 95% ethyl alcohol, to first dehydrate the alcohol by any convenient procedure until sufficient water has been extracted that the alcohol will become miscible with the petroleum naphtha in the proportions of the two components employed. This preliminary procedure also prevents the possibility of the clay adsorbing moisture should it be advantageous to keep the clay in a thoroughly dry condition.

As an example of my preferred method, clay that has been used for removing color from an extraction mass of rosin in petroleum naphtha, is first treated with hot petroleum naphtha to displace the extraction mass from the clay and also to raise the clay to a relatively high temperature. The temperature of the naphtha is preferably about the boiling point of the alcohol to be subsequently used. The clay is then washed with a previously prepared solution of denatured alcohol and petroleum naphtha, the two ingredients being mixed in equal proportions and the mixture heated to approximately its boiling point. The amount of the mixture to be used will depend somewhat upon the amount of adsorbed materials in the clay, but in general an amount of the mixture equal to the weight of the clay will be satisfactory. The solution of the impurities in the hot mixture is then displaced with hot petroleum naphtha until essentially all of the alcohol is removed from the clay. The alcohol-naphtha extract and the petroleum naphtha user as a wash are collected in the same vessel, whereby the alcohol becomes mixed with an excess of petroleum naphtha. The alcohol is then recovered free from the extracted materials by fractional distillation of the mixture. If the distillate is cut at the point when all the alcohol has been distilled off, the distillate will be found to contain about the right proportions of alcohol and petroleum naphtha for reuse as an extracting agent.

As a modification of the above process, the step of washing the contaminated clay with the naphtha may be stopped after all the coloring matters have been washed out, and any alcohol-naphtha mixture remaining in the clay may be distilled from the clay as in the case of recovering alcohol from the alcohol-petroleum naphtha extract containing an excess of petroleum naphtha. The last traces of alcohol remaining in the clay also have an excess of petroleum naphtha present and the alcohol distills off, mixed with the petroleum naphtha, in about the proportions for reuse as a revivifying agent.

By the term "light petroleum distillate" as used in the claims, we mean to include all of the various fractions of petroleum distillation which are liquid at normal temperatures and are of sufficiently low viscosity to pass through the filter-mass without difficulty.

I am aware that numerous details of the process may be varied through a wide range without departing from the principles of this invention, and I, therefore, do not purpose limiting the patent granted hereon otherwise than necessitated by the prior art.

I claim as my invention:

1. The process of revivifying a decolorizing clay containing rosin impurities, which comprises treating the clay with a mixture of alcohol and an organic solvent for the same to dissolve the impurities in the clay and displacing the solution so formed from the clay with an organic alcohol solvent.

2. The process of revivifying fuller's earth containing rosin impurities, which comprises treating the fuller's earth with a hot mixture of a light petroleum distillate and an alcohol, the petroleum distillate having a boiling range above that of the alcohol and displacing the solution of the impurities in the mixture of solvents with a light petroleum distillate.

3. The process of purifying a contaminated clay as obtained in the purification of rosin, which comprises treating the clay with a mixture of approximately equal proportions of alcohol and petroleum naphtha to dissolve the impurities in the clay and displacing the solution of the impurities so formed with a further quantity of petroleum naphtha.

4. The process of purifying a contaminated clay as obtained in the purification of rosin, which comprises treating the clay with a mixture of approximately equal proportions of substantially anhydrous ethyl alcohol and petroleum naphtha at a temperature approximating the boiling temperature of the alcohol to dissolve the impurities in the clay and displacing the solution of the impurities so formed with a further quantity of petroleum naphtha.

5. The process of purifying a clay contaminated with a rosin solution and rosin impurities, which comprises displacing the rosin solution from the clay with a light petroleum distillate, treating the clay with a hot mixture of an alcohol and a light petroleum distillate having a higher boiling range than the alcohol until the impurities have been substantially dissolved and displacing the mixture containing the dissolved impurities by means of further quantities of the light petroleum distillate.

6. The process of purifying a clay contaminated with a rosin solution and rosin impurities, which comprises displacing the rosin solution from the clay with a light petroleum distillate, treating the clay with a hot mixture of an alcohol and a light petroleum distillate having a higher boiling range than the alcohol, until the impurities have been substantially dissolved, displacing the mixture containing the dissolved impurities by means of further quantities of the light petroleum distillate, combining the displaced mixture and excess petroleum distillate used and distilling to recover the alcohol mixed with petroleum distillate for reuse.

7. The process of revivifying fuller's earth containing rosin impurities, which comprises treating the fuller's earth with a hot mixture of a light petroleum distillate and an alcohol, the petroleum distillate having a boiling range above that of the alcohol, displacing the solution of the impurities in the mixture of solvents with a light petroleum distillate, combining the displaced mixture and excess petroleum distillate used and distilling the resulting solution to recover the alcohol mixed with petroleum distillate for reuse in the process.

In testimony whereof I have hereunto subscribed my name.

ROBERT C. PALMER.